(12) United States Patent
Son et al.

(10) Patent No.: US 10,170,198 B2
(45) Date of Patent: Jan. 1, 2019

(54) DATA STORAGE AND METHOD OF OPERATING THE SAME

(71) Applicant: Samsung Electronics Co., Ltd., Suwon-si, Gyeonggi-do (KR)

(72) Inventors: Pilchang Son, Suwon-si (KR); Soohwan Kang, Seoul (KR); Yonggeun Oh, Ansan-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 204 days.

(21) Appl. No.: 15/092,804

(22) Filed: Apr. 7, 2016

(65) Prior Publication Data

US 2016/0358670 A1    Dec. 8, 2016

(30) Foreign Application Priority Data

Jun. 5, 2015 (KR) .................. 10-2015-0080039

(51) Int. Cl.
*H04L 29/06* (2006.01)
*G11C 29/38* (2006.01)
*G06F 3/06* (2006.01)
*G06F 21/64* (2013.01)
*G11C 11/00* (2006.01)
(Continued)

(52) U.S. Cl.
CPC .......... *G11C 29/38* (2013.01); *G06F 3/0619* (2013.01); *G06F 3/0656* (2013.01); *G06F 3/0679* (2013.01); *G06F 21/64* (2013.01); *G11C 11/005* (2013.01); *G11C 5/04* (2013.01); *G11C 16/00* (2013.01); *G11C 2029/0409* (2013.01); *H04L 9/3252* (2013.01)

(58) Field of Classification Search
CPC ...................................... G11C 29/38
See application file for complete search history.

(56) References Cited

U.S. PATENT DOCUMENTS 4,523,087 A * 6/1985 Benton ............... G06Q 20/341
                                                  235/379
7,010,639 B2   3/2006 Larson et al.
(Continued)

FOREIGN PATENT DOCUMENTS

DE        4107020 A1 * 9/1992  ............ G06K 1/126
JP    2010-086318 A    4/2010
(Continued)

OTHER PUBLICATIONS

Jacobi, Jon L. "Everything you need to know about NVMe, the insanely fast future for SSDs". Apr. 3, 2015. Retrieved from https://www.pcworld.com/article/2899351/storage/everything-you-need-to-know-about-nvme.html (Year: 2015).*
(Continued)

*Primary Examiner* — Shawnchoy Rahman
(74) *Attorney, Agent, or Firm* — Harness, Dickey & Pierce, P.L.C.

(57) ABSTRACT

A data storage may include at least one nonvolatile memory device and a controller operatively connected to the at least one nonvolatile memory device. The controller is configured to receive binary data from a host through a side-band interface. The controller is configured to execute the binary data according to a request from the host to execute a test operation. A test operation with respect to the data storage may be executed through a side-band interface.

14 Claims, 17 Drawing Sheets

(51) Int. Cl.
*H04L 9/32* (2006.01)
*G11C 5/04* (2006.01)
*G11C 16/00* (2006.01)
*G11C 29/04* (2006.01)

(56) References Cited

U.S. PATENT DOCUMENTS

| | | |
|---|---|---|
| 7,240,130 B2 | 7/2007 | Larson et al. |
| 7,313,136 B2 | 12/2007 | Villefrance et al. |
| 7,630,304 B2 | 12/2009 | Larson et al. |
| 7,679,133 B2 | 3/2010 | Son et al. |
| 8,032,745 B2 | 10/2011 | Bandholz et al. |
| 8,270,611 B2 | 9/2012 | Boerger |
| 8,553,466 B2 | 10/2013 | Han et al. |
| 8,559,235 B2 | 10/2013 | Yoon et al. |
| 8,654,587 B2 | 2/2014 | Yoon et al. |
| 2003/0100321 A1* | 5/2003 | Rao .................... H04W 88/184 455/466 |
| 2011/0233648 A1 | 9/2011 | Seol et al. |
| 2013/0067233 A1* | 3/2013 | Vanstone ............. G06Q 20/341 713/176 |
| 2014/0052950 A1 | 2/2014 | Matsushita |
| 2014/0289559 A1* | 9/2014 | Hashimoto ............ G11C 29/08 714/27 |
| 2016/0285624 A1* | 9/2016 | Wagh ....................... H04B 3/46 |

FOREIGN PATENT DOCUMENTS

| | | |
|---|---|---|
| JP | 2014-038436 A | 2/2014 |
| KR | 10-0801759 B1 | 2/2008 |
| KR | 10-1257041 B1 | 4/2013 |
| KR | 10-1365359 B1 | 2/2014 |

OTHER PUBLICATIONS

Allen, David. "NVM Express Ecosystem Enabling PCIe NVMe Architectures". Jan. 29, 2015 (Year: 2015).*
"Enterprise SSD Form Factor" Version 1.0. Dec. 20, 2011 (Year: 2011).*

* cited by examiner

DATA STORAGE AND METHOD OF OPERATING THE SAME

CROSS-REFERENCE TO RELATED APPLICATIONS

This U.S. non-provisional patent application claims priority under 35 U.S.C. § 119 to Korean Patent Application No. 10-2015-0080039, filed on Jun. 5, 2015, the entire contents of which are hereby incorporated by reference.

BACKGROUND

Example embodiments relate to a data storage, and more particularly, to an on-board SSD (solid state drive) in which constituent elements are directly mounted on a substrate.

Semiconductor memory devices may be classified into volatile semiconductor memory devices and nonvolatile semiconductor memory devices. Volatile semiconductor memory devices have a high read/write speed but have a disadvantage of losing their stored data when their power supplies are interrupted. Nonvolatile semiconductor memory device retain their stored data even when their power supplies are interrupted. Thus, nonvolatile memory devices are used to remember contents that have to be preserved regardless of whether power supplies are supplied or not.

An example of a data storage using the nonvolatile memory devices includes a solid state drive (SSD). Since a SSD is shipped out in a finished product form by a memory vendor, the SSD can be tested through a joint test action group (JTAG) interface. However, after a controller and a nonvolatile memory device constituting the SSD are individually delivered by a memory vendor, in the case of an on-board SSD being mounted on a board, a JTAG interface cannot be used. Thus, even though a problem occurs in an on-board SSD, a test cannot be performed using an existing JTAG interface. Furthermore, it is practically difficult to embed all test programs in an on-board SSD before delivering constituent elements of the on-board SSD.

Thus, preparing a method capable of executing a test operation with respect to an on-board SSD is being magnified as an important issue.

SUMMARY

Example embodiments of inventive concepts provide data storage. The data storage may include at least one nonvolatile memory device, and a controller operatively connected to the at least one nonvolatile memory device. The controller is configured to receive binary data from a host through a side-band interface. The controller is configured to execute the binary data according to a request from the host to execute a test operation.

In example embodiments of inventive concepts, the side-band interface may be an interface that is not a JTAG.

In example embodiments of inventive concepts, the controller may include a side-band manager configured to receive the binary data and the request from the host, and a buffer that is configured to store the binary data.

In example embodiments of inventive concepts, the controller may be configured to receive address information for storing the binary data and size information corresponding to the binary data.

In example embodiments of inventive concepts, the controller may be configured to store the binary data in the buffer according to the address information and the size information.

In example embodiments of inventive concepts, the controller may be configured to receive an ECDSA (elliptic curve digital signature algorithm) signature from the host. The controller may be configured to check validity of the binary data using the ECDSA signature.

In example embodiments of inventive concepts, the binary data may be divided according to a property of the test operation and is received from the host, and a size of the divided binary data may be equal to or smaller than a size of the buffer.

In example embodiments of inventive concepts, the controller may be configured to receive encrypted binary data from the host and the controller may be configured to decrypt the encrypted binary data.

In example embodiments of inventive concepts, the data storage may be an on-board SSD in which the at least one nonvolatile memory device and the controller are mounted on a board.

In example embodiments of inventive concepts, the board may include one of a printed circuit board, a flexible board, a tape board and a combination thereof.

Example embodiments of inventive concepts also relate to a method of operating a data storage. The data storage is configured to transmit and receive data to and from a host. The method may include receiving binary data from the host through a side-band interface and executing the binary data according to a request from the host. The binary data may be for executing a test operation with respect to the data storage.

In example embodiments of inventive concepts, the receiving binary data may include receiving an ECDSA (elliptic curve digital signature algorithm) signature. The controller may be configured to using the ECDSA signature for a validity check of the binary data.

In example embodiments of inventive concepts, the may further include storing the binary data in a buffer according to address and size information of the binary data, and checking validity of the binary data using the ECDSA signature. The storing the binary data and the checking validity data of the binary data may be performed after receiving the binary data.

In example embodiments of inventive concepts, the receiving the binary data may include dividing the binary data according to a property of the test operation for the data storage.

In example embodiments of inventive concepts, the method may further include determining whether the divided binary data has all been executed.

According to example embodiments of inventive concepts, a data storage includes at least one nonvolatile memory device and a controller operatively connected to the at least one nonvolatile memory device. The controller is configured to receive binary data from a host through a side-band interface. The controller is configured to perform a validity test on the binary data. The controller is configured to execute the binary data for performing at least one test operation if the validity test indicates that the binary data is valid.

In example embodiments of inventive concepts, the side-band interface may be an interface that is not a JTAG.

In example embodiments of inventive concepts, the binary data may include an ECDSA (elliptic curve digital signature algorithm) signature from the host. The controller may be configured to check validity of the binary data using the ECDSA signature.

In example embodiments of inventive concepts, the binary data may include address information and size information. The controller may be configured to determine if a size of the binary data is less than or equal to an available space of a first memory. The controller may be configured to send an error code to the host if the size of the binary data is greater than the available space of the first memory. The controller may be configured to store the binary data in the available space of the first memory if the size of the binary data is less than or equal to the available space of the first memory. The controller may be configured to execute the binary data for performing the at least one test operation if the size of the binary data is less than or equal to the available space of the first memory.

In example embodiments of inventive concepts, the binary data may include address information and size information. The controller may be configured to determine if a size of the binary data is less than or equal to an available space of a first memory. The controller may be configured to store the binary data in the available space of the first memory if the size of the size of the binary data is less than or equal to the available space of the first memory. The controller is configured to at least one of store the binary data in a second memory that has a larger available capacity than the first memory if the size of the binary data is less than or equal to the available space of the first memory, and divide the binary data into portions that are each smaller than the available capacity of the first memory. The controller is configured to execute the binary data for performing the at least one test operation after storing the binary data in the first memory, storing the binary data in the second memory, or storing binary data divided into portions.

BRIEF DESCRIPTION OF THE FIGURES

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
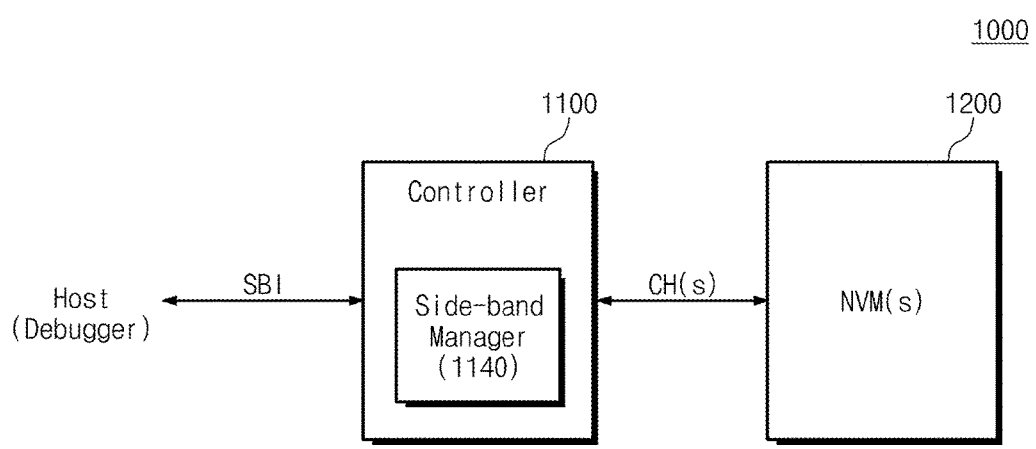
FIG. 1 is a block diagram illustrating data storage in accordance with example embodiments of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

Spatially relatively terms, such as d region/layer, and, similarly, a second region/layer could be termed a first region/layer without departing from the teachings of the disclosure are only used to distinguish one element from another. For example, it will be understood that the spatially relative terms are intended to encompass different orientations of the device in use and/or operation in addition to the orientation depicted in the figures. For example, when the device in the figures is turned over, elements described as below and/or beneath other elements or features would then be oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list. Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array. In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and US Pat. Pub. No. 2011/0233648.

FIG. 1 is a block diagram illustrating data storage in accordance with example embodiments of inventive concepts. The data storage 1000 may include a controller 1100 and a nonvolatile memory device 1200.

The data storage 1000 may be an on-board SSD (solid state drive) on which the controller 1100 and the nonvolatile memory device 1200 are directly mounted on a board (e.g., a printed circuit board). The controller 1100 may be operatively connected to the nonvolatile memory device 1200. The nonvolatile memory device 1200 may include one or more nonvolatile memory devices.

The controller 1100 may include a side-band manager 1140. The side-band manager 1140 may communicate with a host (e.g., debugger) through a side-band interface (SBI). The side-band interface may mean an interface additionally being provided except a general interface like an in-band interface. For example, the side-band interface may include at least one of I2C, UART (universal asynchronous receiver/transmitter), and MTCP (management component transport protocol). However, example embodiments are not limited thereto and the side-band interface may be an interface except a JTAG (joint test action group). For example, the side-band manager 1140 may be constituted by software, hardware or combinations thereof.

The data storage 1000 may receive software or firmware of a binary data form from the host (e.g., debugger) through the side-band interface. The data storage 1000 may execute a test operation with respect to the data storage by executing received software or received firmware. According to example embodiments of inventive concepts, even after a memory vendor delivers constituent elements (e.g., controller, nonvolatile memory, DRAM, or package thereof, etc.) constituting the data storage 1000 such as the controller 1100 and the nonvolatile memory device 1200, a test operation with respect to the data storage 1000 may be effectively executed through the side-band interface SBI.

Figure 2:
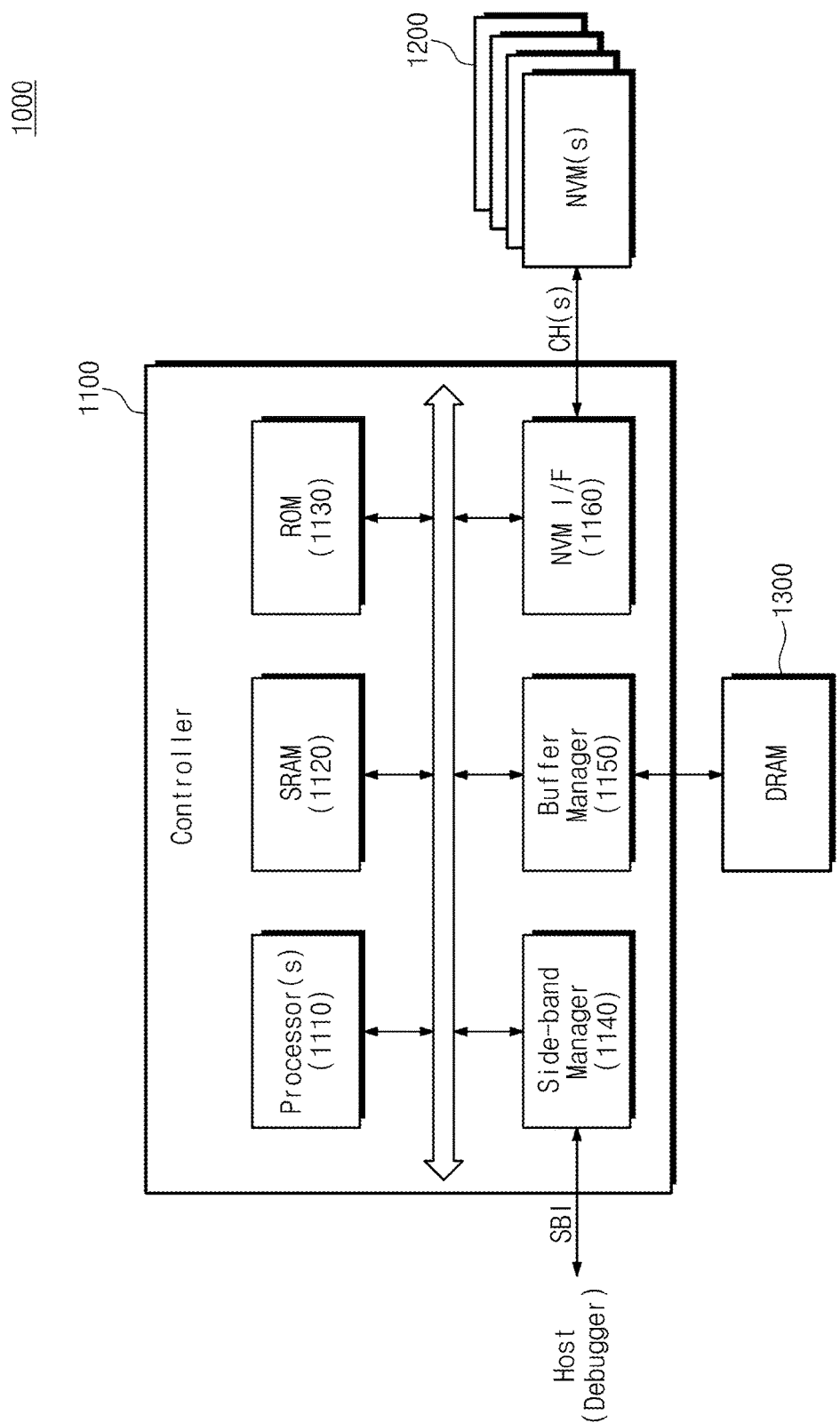
FIG. 2 is a block diagram illustrating a constitution of a controller illustrated in FIG. 1 in further detail.

FIG. 2 is a block diagram illustrating a constitution of a controller illustrated in FIG. 1 in further detail. Referring to FIG. 2, the controller 1100 may include at least one processor 1110, a buffer (e.g., SRAM 1120), a ROM 1130, a side-band manager 1140, a buffer manager 1150, and a nonvolatile memory interface 1160. In FIG. 2-5, an example is described where the buffer is an SRAM 1120, but example embodiments are not limited thereto.

In example embodiments, the processor 1110 may be a hardware processor such as central processing unit (CPU), a multi-processor, a distributed processing system, an application specific integrated circuit (ASIC), and/or a suitable hardware processing unit, that when executing software or firmware, configures the processor 1110 as a special-purpose processor 1110 for controlling one or more operations of the controller 1100.

For example, the processor 1110 may drive firmware for operating the controller 1100. The processor 1110 may drive software or firmware for testing the data storage 1000. The firmware may be loaded into the SRAM 1120 to be driven. The firmware may be a flash translation layer (FTL), a test program, etc. Additional operations controlled by the processor 1110 are described subsequently with reference to FIGS. 3-11 of the present application.

Software/firmware for controlling the controller 1100, or software/firmware for testing the data storage 1000 may be loaded into the SRAM 1120. Although the SRAM 1120 is used in the drawing, the SRAM 1120 may be replaced with a cache memory, a DRAM (dynamic random access memory), a PRAM (phase-change RAM), or a flash memory device and combinations thereof.

Various information or firmware used in operating the controller 1100 may be stored in the ROM 1130. Code data for an interface with the host (e.g., debugger) may be stored in the ROM 1130.

The side-band manager 1140 may include a side-band interface providing an interface with the host (e.g., debugger). For example, the side-band interface may include an interface (e.g., I2C, UART, MTCP, etc.) which is not a JTAG.

Although not illustrated in the drawing, the controller 1100 may further include a host interface. The host interface (not illustrated) may provide an interface between the host and the controller 1100. The host and the controller 1100 may be connected to each other through at least one of various standard interfaces. The standard interfaces may include various interfaces such as an advanced technology attachment (ATA), a serial ATA (SATA), an external SATA (e-SATA), a small computer system interface (SCSI), a serial attached SCSI (SAS), a PCI express (PCI-E), a universal serial bus (USB), an IEEE 1394, a card interface, etc.

The buffer manager 1150 may provide an interface between the controller 1110 and the DRAM 1300. Data to be stored in the nonvolatile memory device 1200 or data to be read from the nonvolatile memory device 1200 may be temporarily stored in the DRAM 1300 via the buffer manager 1150.

The nonvolatile memory interface 1160 may provide an interface between the controller 1100 and the nonvolatile memory device 1200. For example, the controller 1100 may transmit/receive data to/from the nonvolatile memory device 1200 through the nonvolatile memory interface 1160.

The nonvolatile memory device 1200 may be a three-dimensional nonvolatile memory device in which a cell string to which memory cells are connected is formed in a direction perpendicular to a substrate. However, example embodiments are not limited thereto and the nonvolatile memory device 1200 may be a planar type memory device. The nonvolatile memory device may be connected to the nonvolatile memory interface 1160 through a plurality of channels CH.

The DRAM 1300 may temporarily store data to be stored in the nonvolatile memory device 1200, or data to be read from the nonvolatile memory device 1200. Although the DRAM 1300 is illustrated in the drawing, example embodiments are not limited thereto and a SRAM (static random access memory), a PRAM (phase-change RAM), or combinations thereof may be used.

Figure 3:
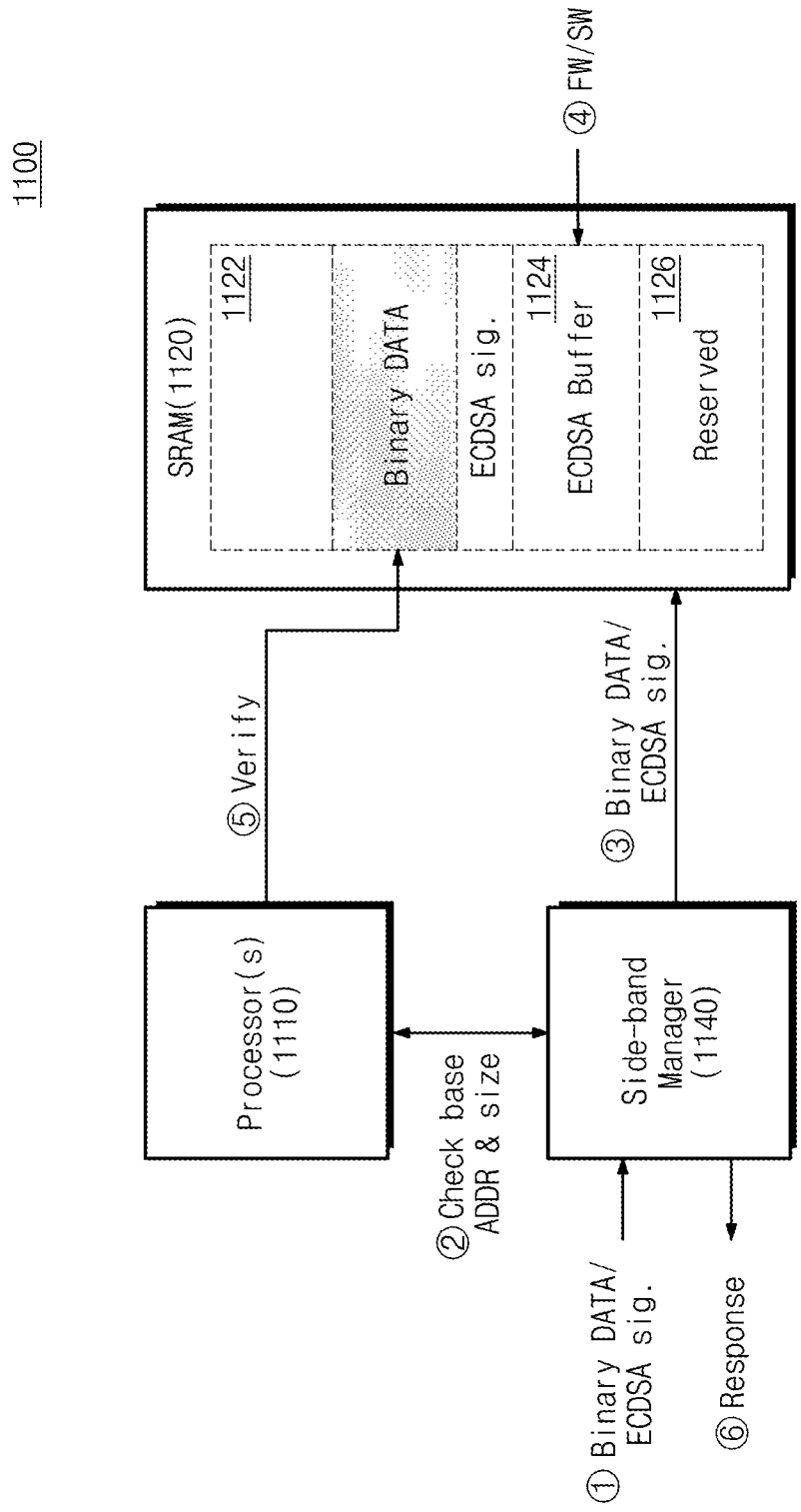
FIGS. 3 and 4 are block diagrams illustrating a process of receiving binary data for testing data storage through a side-band interface according to example embodiments of inventive concepts.
Figure 4:
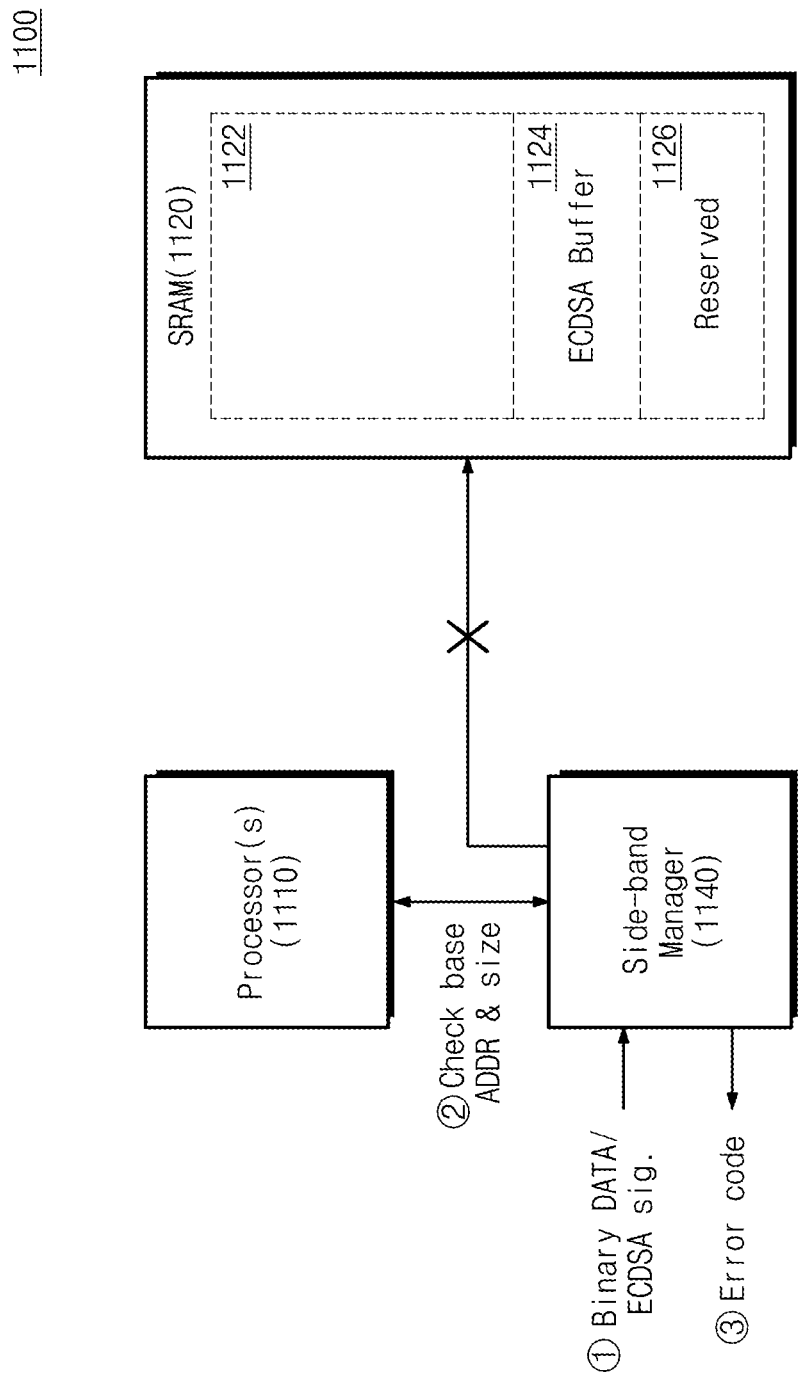

FIGS. 3 and 4 are block diagrams illustrating a process of receiving binary data for testing data storage through a side-band interface according to example embodiments of inventive concepts.

Referring to FIG. 3, the side-band manager 1140 may receive binary data for executing a test operation with respect to the data storage 1000 through a side-band interface ($\hat{1}$). The binary data may include address information of the SRAM 1120 in which the binary data to be stored and size information of the binary data. An ECDSA (elliptic curve digital signature algorithm) may be received together with the binary data. The ECDSA is a sort of digital signature scheme for testing validity of binary data. However, a digital signature scheme for testing validity of binary data is not limited to the ECDSA and various authentication methods such as a ELGamal method, a DSA (digital signature algorithm) method, a Schnorr method, etc. may be used.

If binary data is received from the host (e.g., bugger), the processor 1110 may check address information and size information included in the binary data ($\hat{2}$). For example, the processor 1110 may check whether or not the binary data is received by periodically polling the side-band manager 1140 or using an interrupt method.

If a size of the binary data is smaller than an available space of the SRAM 1120 and the binary data is stored according to address information not to create a collision with a system, the binary data and the ECDSA signature may be stored in the SRAM 1120 ($\hat{3}$). For example, the binary data and the ECDSA signature may be stored in a first area 1122 of the SRAM 1120.

If a size of the binary data is greater than an available space of the SRAM 1120 and the binary data is stored according to address information to create a collision with a system, the binary data and the ECDSA signature may not be stored in the SRAM 1120. This feature is illustrated in FIG. 4. As illustrated in FIG. 4, the side-band manager 1140 may send an error code to the host ($\hat{3}$).

Referring to FIG. 3 again, firmware or software for testing validity of the binary data may be loaded (($\hat{4}$)). This is to limit and/or prevent an execution of firmware or software by an unauthenticated user. For example, the firmware or the software for testing validity of the binary data may be loaded from the ROM 1130 (refer to FIG. 2) or the nonvolatile memory device 1200 (refer to FIG. 2). The firmware or the software may be loaded into a second area 1124 of the SRAM 1120. A remaining area or other area 1126 of the SRAM 1120 may be used to store other information.

The processor 1110 may test validity of binary data using the loaded firmware or software, and the ECDSA signature ($\hat{5}$). If it is determined that the binary data is valid, the side-band manager 1140 may send a signal that the binary data is valid to the host (e.g., debugger) ($\hat{6}$). After that, a test operation with respect to the data storage is executed by executing the binary data. If it is determined that the binary data is invalid, a test operation with respect to the data storage is not executed.

Figure 5:
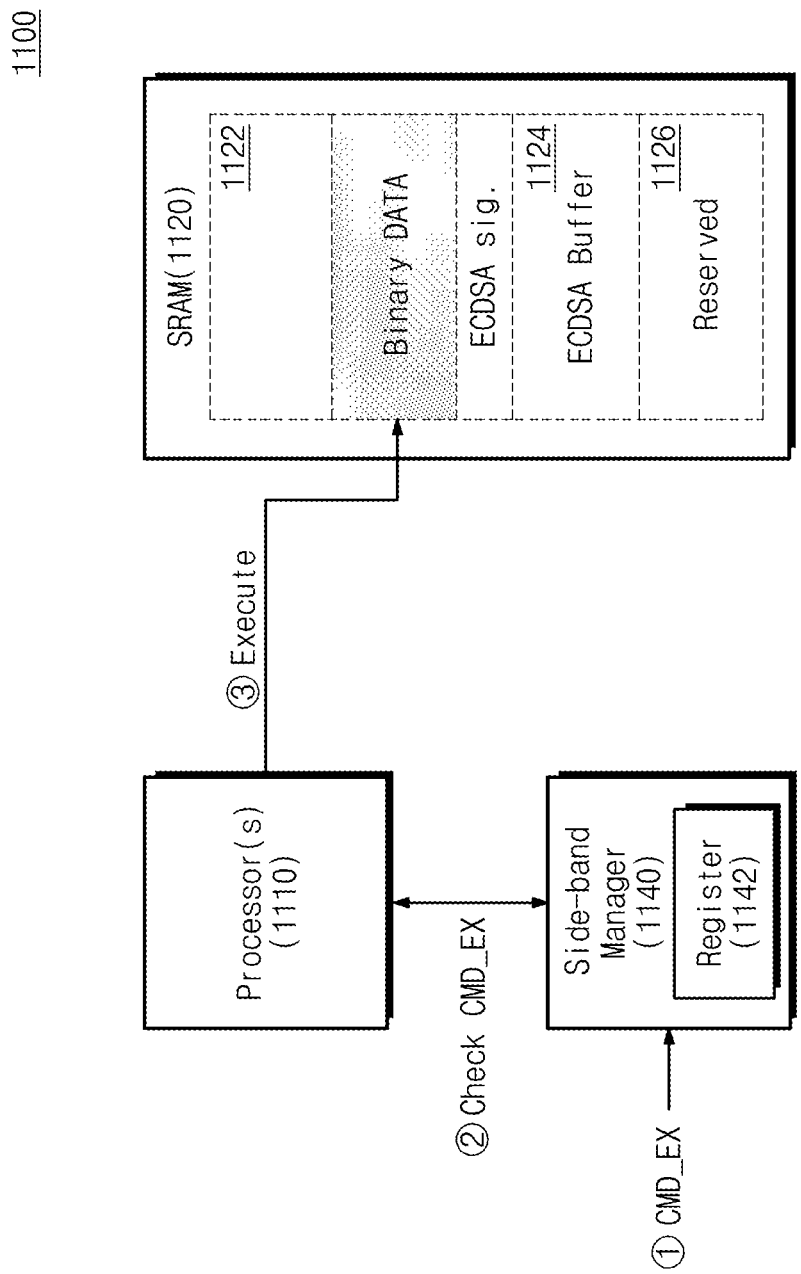
FIG. 5 is a block diagram illustrating a process of executing binary data after a validity test for binary test.

FIG. 5 is a block diagram illustrating a process of executing binary data after a validity test for binary test.

An execution command CMD_EX with respect to binary data may be received from a host (e.g., debugger) ($\hat{1}$). For example, the execution command (CMD_EX) may be stored in a register 1142 included in the side-band manager 1140. The processor 1110 may check whether or not the execution command CMD_EX is received by periodically polling the side-band manager 1140 or using an interrupt method (②). The processor 1110 may execute a variety of test operations with respect to the data storage by executing binary data stored in the SRAM 1120 (③).

In FIGS. 3 through 5, it was described that after receiving binary data, the binary data is executed by a separate command. However, example embodiments are not limited thereto. For example, an execution command CMD_EX may be included in the binary data. That is, if it is determined that the received binary data is valid, the execution command CMD_EX may be immediately executed and thereby a variety of test operations with respect to the data storage may be executed.

Figure 6:
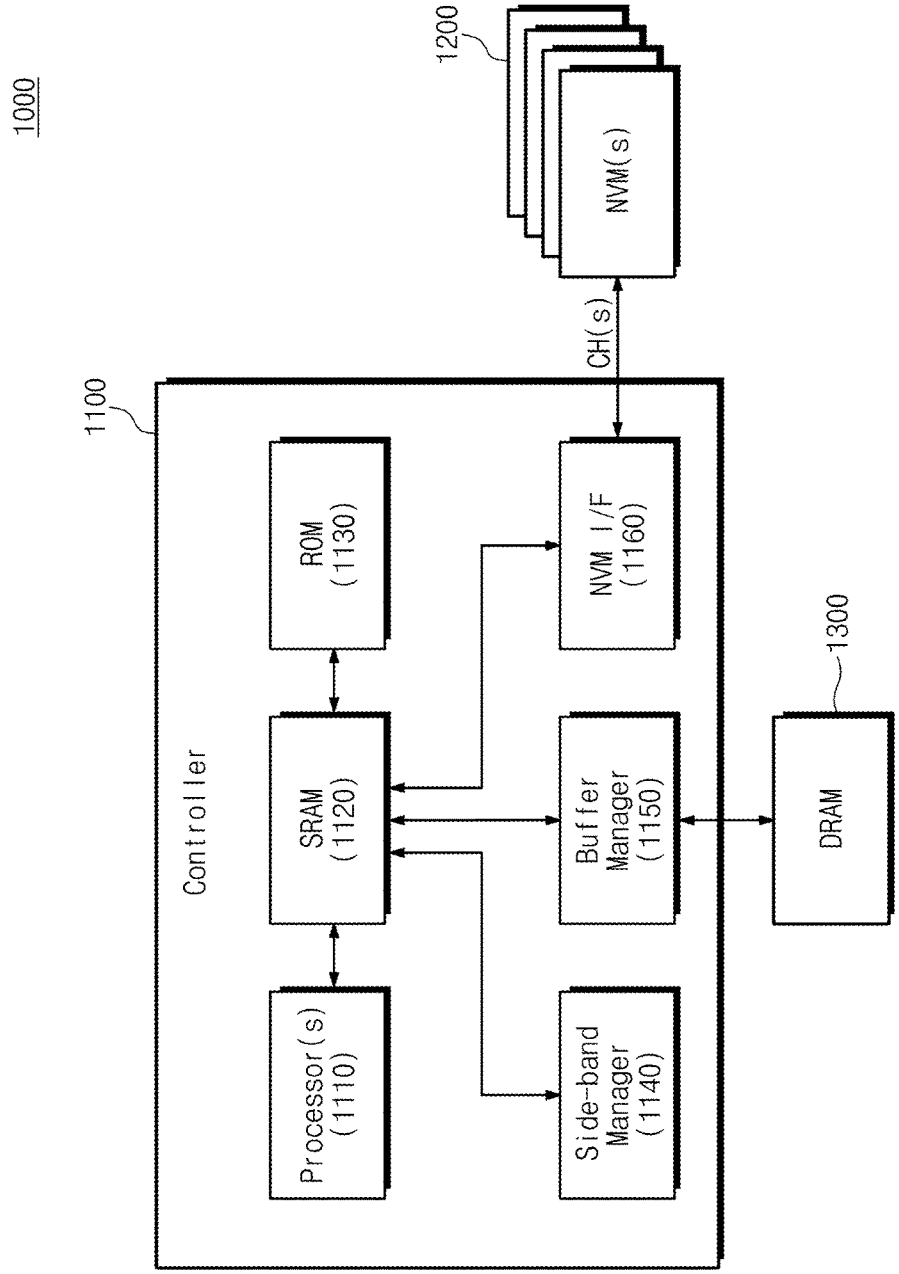
FIG. 6 is a block diagram conceptually illustrating an execution of a test operation with respect to data storage by executing binary data stored in a SRAM.

FIG. 6 is a block diagram conceptually illustrating an execution of a test operation with respect to data storage by executing binary data stored in a SRAM.

The processor 1110 may execute binary data stored in the SRAM 1120 to execute a variety of test operations with respect to the controller 1100, the nonvolatile memory device 1200 and the DRAM 1300. For example, various test operations such as a data exchange test between the SRAM 1120 and the DRAM 1300, a data write test to the nonvolatile memory device 1200 and a data read test from the nonvolatile memory device 1200 may be executed.

Figure 7:
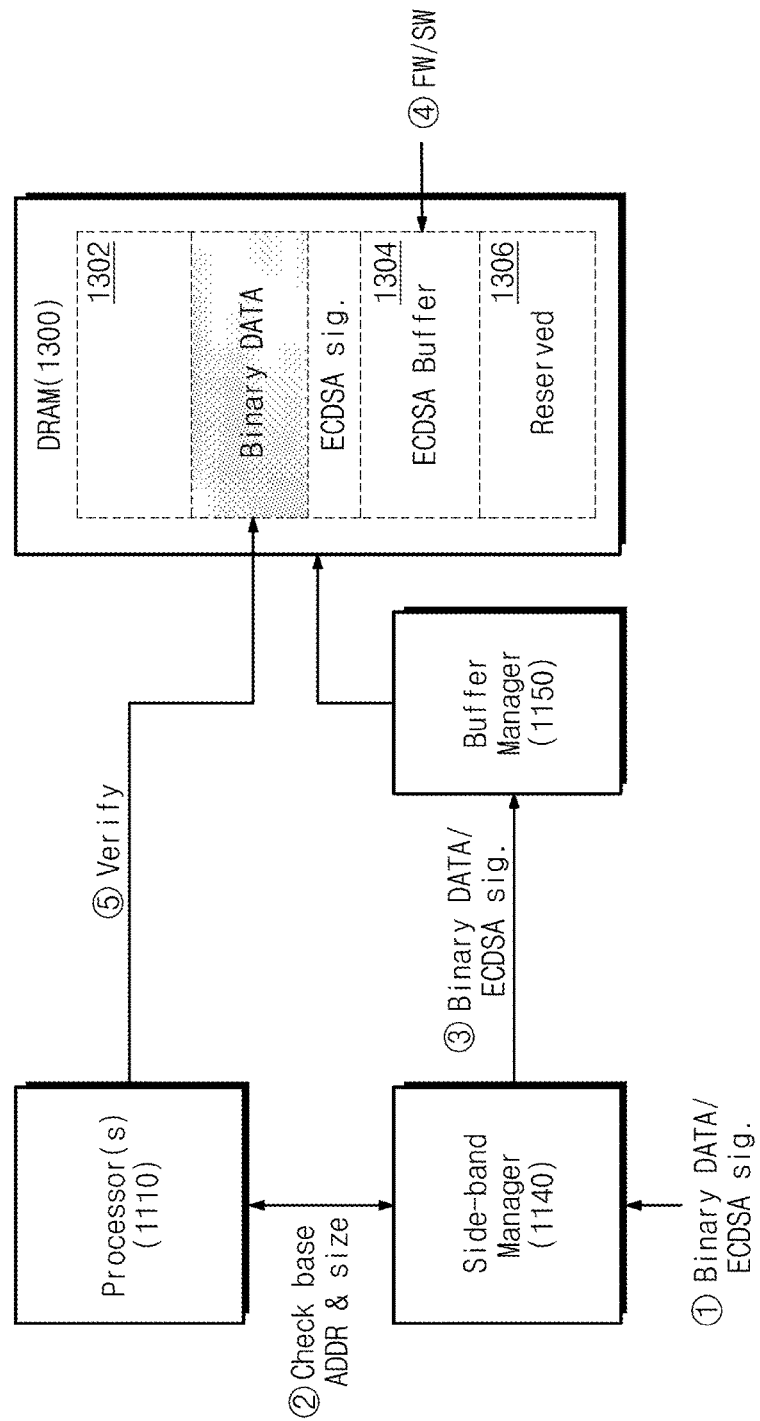
FIG. 7 is a block diagram illustrating a process of receiving binary data for testing data storage through a side-band interface according to example embodiments of inventive concepts.

FIG. 7 is a block diagram illustrating a process of receiving binary data for testing data storage through a side-band interface according to example embodiments of inventive concepts.

If a size of the binary data is greater than an available size of the SRAM 1120, a test operation with respect to the data storage cannot be executed by receiving the binary data. In this case, the DRAM 1300 having a capacity greater than that of a SRAM may be used. Since a basic operation of receiving the binary data is similar to those described in FIGS. 2 and 3, descriptions of overlapped parts may be omitted. The received binary data and the ECDSA signature may be stored in the DRAM 1300 via the buffer manager 1150. After that, according to an execution command of the binary data, a test operation with respect to the data storage may be executed.

Figure 8:
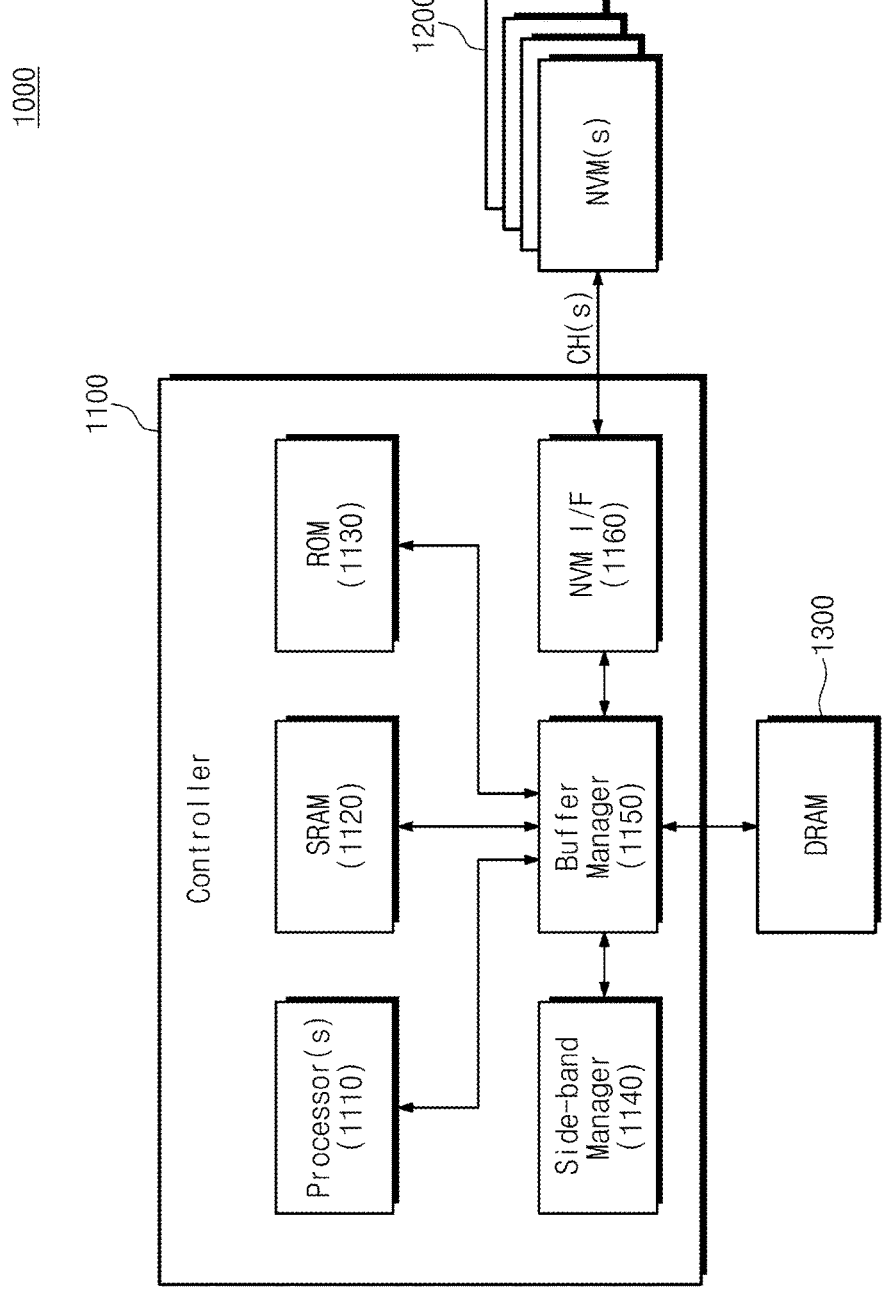
FIG. 8 is a block diagram conceptually illustrating an execution of a test operation with respect to data storage by executing binary data stored in a DRAM.

FIG. 8 is a block diagram conceptually illustrating an execution of a test operation with respect to data storage by executing binary data stored in a DRAM.

The processor 1110 may execute binary data stored in the DRAM 1300 to execute a variety of test operations with respect to the controller 1100, the nonvolatile memory device 1200, and the DRAM 1300. For example, various test operations such as a data exchange test between the SRAM 1120 and the DRAM 1300, a data write test to the nonvolatile memory device 1200 and a data read test from the nonvolatile memory device 1200 may be executed.

Figure 9:
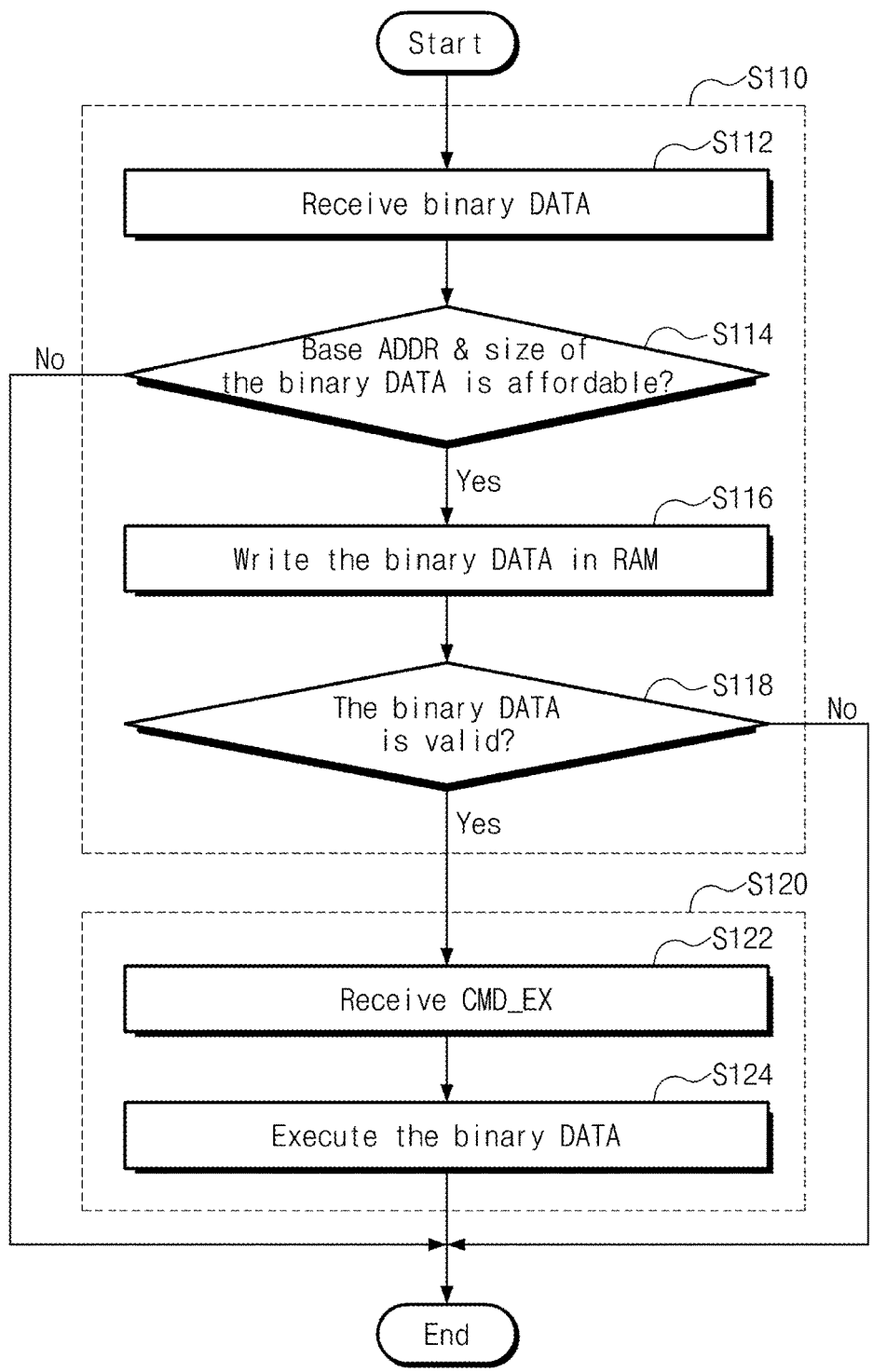
FIG. 9 is a flow chart illustrating a process of executing a test operation with respect to data storage according to example embodiments of inventive concepts.

FIG. 9 is a flow chart illustrating a process of executing a test operation with respect to data storage according to example embodiments of inventive concepts.

A test operation with respect to the data storage may include receiving binary data through a side-band interface S110 and executing the binary data S120.

In operation S112, binary data may be received. The binary data may be received through a side-band interface such as I2C, UART, and MTCP. The binary data may include software or firmware for a variety of test operations with respect to the data storage. The binary data may include address information of a memory in which the binary data is to be stored and size information of the binary data. The binary data may be received together with an ECDSA signature for a validity check with respect to the binary data.

In operation S114, the received address information and size information may be checked. If binary data is stored in a memory according to the received address information and thereby a collision with a system occurs, or a size of the binary data is greater than a capacity of an available memory (No), a normal test procedure cannot be performed. At this time, the side-band manager may send an error code to the host (e.g., debugger) and a procedure may be finished. If it is determined that the received address information and the received size information are appropriate (Yes), the procedure proceeds to operation S116.

In the operation S116, binary data may be stored in a SRAM or a DRAM. The binary data may be stored according to address information received together with the binary data.

In operation S118, it may be determined whether binary data is valid. Validity of the binary data may be determined using an ECDSA signature received together and software or firmware for a validity check. The software or the firmware for a validity check of the binary data may be loaded from the ROM 1130 (refer to FIG. 2) or the nonvolatile memory device 1200 (refer to FIG. 2). A branch-off of an operation may occur according to a determination result. If the binary data is determined to be valid (Yes), the procedure goes to operation S122. If the binary data is determined to be invalid (No), the procedure is finished.

In the operation S122, an execution command CMD_EX with respect to the binary data may be received. The execution command CMD_EX may include various protocols for executing various tests with respect to the data storage.

In operation S124, binary data may be executed. As a result of executing binary data, various test operations such as a data exchange test between the SRAM 120 (refer to FIG. 2) and the DRAM 1300 (refer to FIG. 2), a data write test to the nonvolatile memory device 1200 and a data read test from the nonvolatile memory device 1200 may be executed.

In FIG. 9, even though the binary data is executed by a separate command in operation S122 after receiving binary data in operation S112, example embodiments are not limited thereto. For example, an execution command CMD_EX may be included in the binary data. That is, the operation S122 may be omitted, and if it is determined that the received binary data is valid (operation S118), the execution command CMD_EX is immediately executed and thereby a variety of test operations with respect to data storage may be executed.

According to example embodiments of inventive concepts, various software or firmware for testing data storage may be sent and executed through a side-band interface, not a JTAG. As a result, even after a memory vendor delivers constituent elements (e.g., controller, nonvolatile memory device, DRAM, etc.) constituting the data storage, a test operation with respect to the data storage such as an on-board SSD may be effectively executed.

Figure 10:
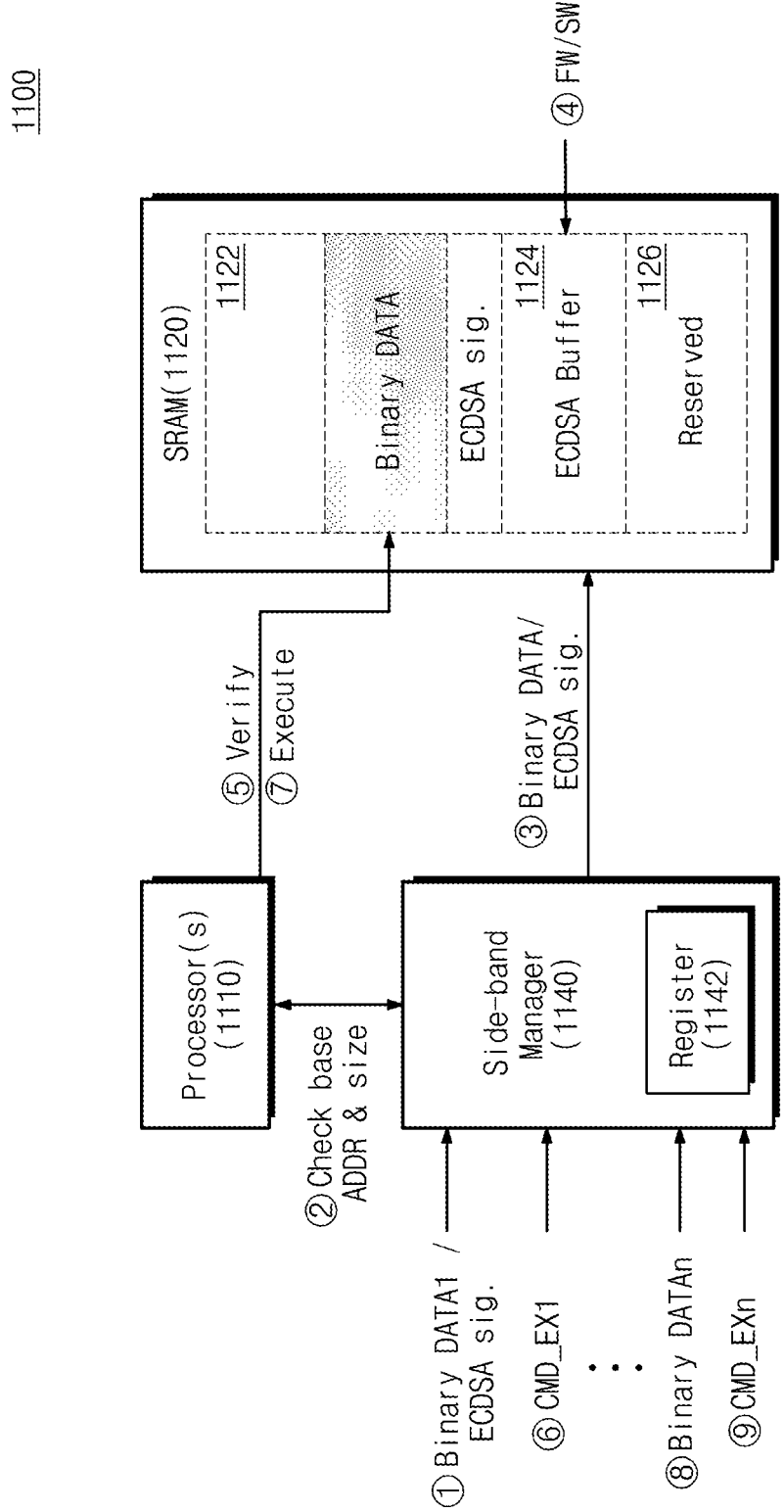
FIG. 10 is a block diagram illustrating a process of receiving and executing binary data for testing data storage through a side-band interface according to example embodiments of inventive concepts.

FIG. 10 is a block diagram illustrating a process of receiving and executing binary data for testing data storage through a side-band interface according to example embodiments of inventive concepts. The example in FIG. 10 is applicable to a case that a size of binary data exceeds an available size of the SRAM 1120 (refer to FIG. 2).

A host (e.g., debugger) may divide binary data according to a property of a test operation with respect to the data storage and sent it (①). As a result of dividing the binary data according to a property of a test operation, the binary data may be functionally divided into a plurality of binary data.

For example, if n number of functions is needed for a specific test operation, the binary data may be functionally divided into n parts to be sent to the controller. For example, a size of the divided binary data may be equal to or smaller than a size of the SRAM 1120.

The controller 1100 may receive binary data DATA1 with respect to a first function from the host. At this time, the binary data may include firmware or software for a test operation, address information needed when the binary data is stored in the SRAM 1120, and size information of the binary data. An ECDSA signature may be received together with the binary data.

The processor 1110 may check the received address information and the received size information, and determine whether to store the binary data in the SRAM 1120 (2̂). If a size of the binary data is smaller than an available space of the SRAM 1120, and the binary data is stored according to address information not to create a collision with a system, the binary data and the ECDSA signature may be stored in the SRAM 1120 (3̂).

It may be determine whether the binary data is valid. To check validity, a separate validity check firmware or software from the ROM or the nonvolatile memory device may be loaded into the second area 1124 of the SRAM 1120 (4̂).

The processor 1110 may drive the validity check firmware or software loaded into the second area 1124 and check validity of the binary data using the ECDSA signature (5̂). If the binary data is valid, the controller 1100 may receive an execution command CMD_EX from the host (6̂). The binary data is executed according to the execution command CMD_EX and thereby a test operation with respect to a first function may be executed (7̂). If the binary data is invalid, a test operation may not be executed.

After that, a receiving operation and an execution operation of the binary data may be sequentially repeated. Binary data DATAn with respect to the last function may be received from the host (8̂). The aforementioned 2̂~6̂ operations are repeated and a test operation with respect to the last function may be executed (9̂).

In example embodiments, non-limiting examples have been described where the binary data is executed by a separate command after receiving binary data. However, example embodiments are not limited thereto. For example, an execution command may be included in each binary data. That is, an execution command CMD_EXn may be included in the binary data DATAn (n is a natural number). If it is determined that the received binary data is valid, an execution command CMD_EX is executed and thereby a variety of test operations with respect to data storage may be executed.

If binary data is functionally divided to be sent and executed, a test operation with respect to the data storage may be executed effectively using a SRAM having a relatively small capacity.

Figure 11:
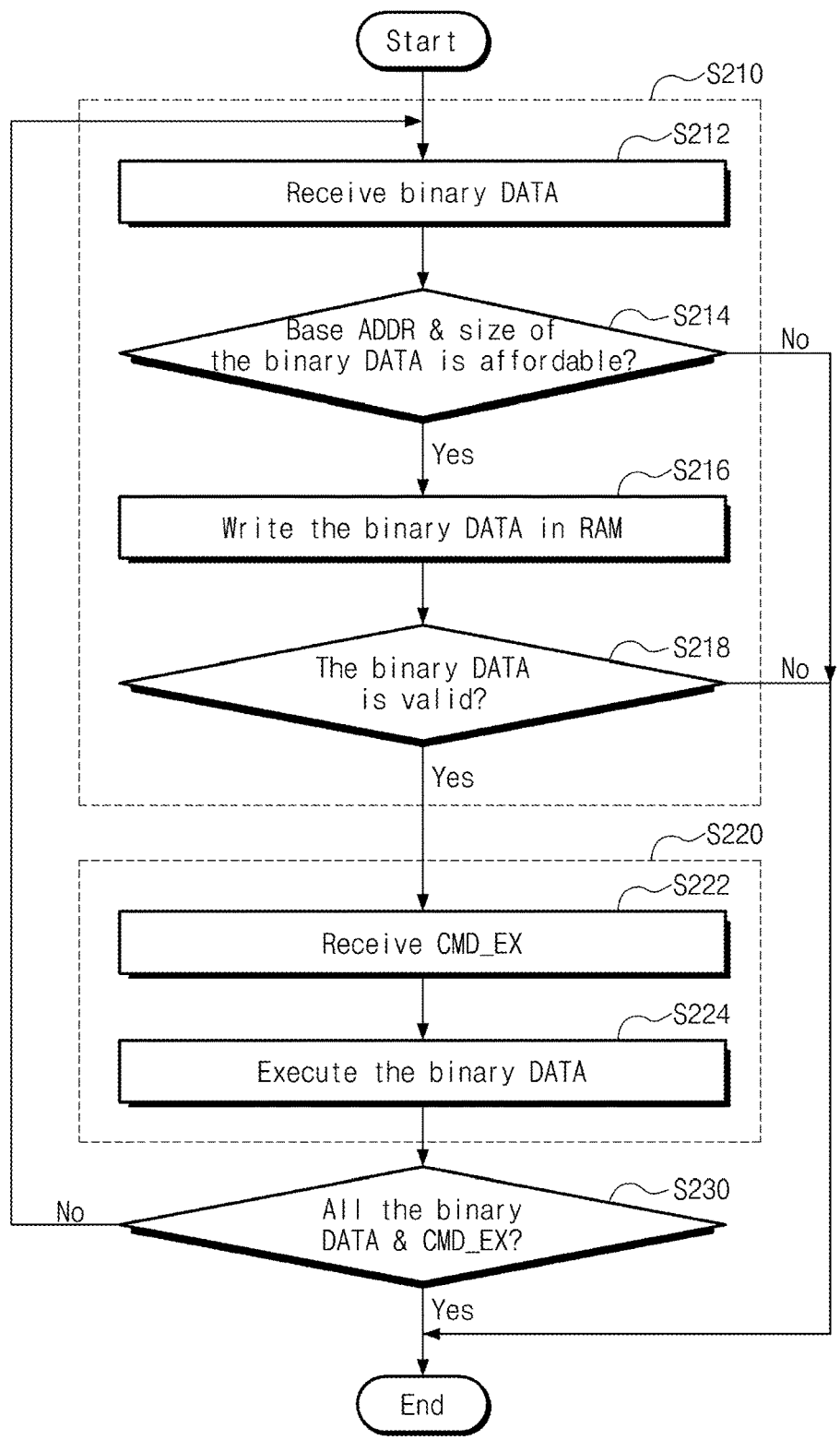
FIG. 11 is a flow chart illustrating a process of executing a test operation with respect to data storage according to example embodiments of inventive concepts.

FIG. 11 is a flow chart illustrating a process of executing a test operation with respect to data storage according to example embodiments of inventive concepts.

A test operation with respect to the data storage may include receiving binary data through a side-band interface S210, executing the binary data S220 and determining whether all binary data is executed S230. The embodiment illustrated in FIG. 11 is similar to the embodiment illustrated in FIG. 9 except that the binary data is functionally divided to be received.

In an operation S212, binary data may be received. The binary data may be functionally divided to be received. The binary data may be received through not a JTAG but a side-band interface. The binary data may include software or firmware for testing data storage. The binary data may include address information on a memory in which the binary data is to be stored and size information of the binary data. The binary data may be received together with an ECDSA signature for a validity check with respect to the binary data.

In an operation S214, the received address information and the received size information may be checked. If binary data is stored in a memory according to the received address information and thereby a collision with a system occurs, or a size of the binary data is greater than a capacity of an available memory (No), a normal test procedure cannot be performed. At this time, the side-band manager may send an error code to the host (e.g., debugger) and a procedure may be finished. If it is determined that the received address information and the received size information are appropriate (Yes), the procedure proceeds to an operation S216.

In the operation S216, binary data may be stored in a SRAM or a DRAM. The binary data may be stored according to address information received together with the binary data.

In an operation S218, it may be determined whether binary data is valid. Validity of the binary data may be determined using an ECDSA signature received together and software or firmware for a validity check. The software or the firmware for a validity check of the binary data may be loaded from the ROM 1130 (refer to FIG. 2) or the nonvolatile memory device 1200 (refer to FIG. 2). A branch-off of an operation may occur according to a determination result. If the binary data is determined to be valid (Yes), the procedure goes to an operation S222. If the binary data is determined to be invalid (No), the procedure is finished.

In the operation S222, an execution command CMD_EX with respect to the binary data may be received. The execution command CMD_EX may include various protocols for executing various tests with respect to the data storage.

In operation S224, binary data may be executed. As a result of executing binary data, various test operations such as a data exchange test between the SRAM 120 (refer to FIG. 2) and the DRAM 1300 (refer to FIG. 2), a data write test to the nonvolatile memory device 1200 and a data read test from the nonvolatile memory device 1200 may be executed.

In operation S230, it may be determined whether all the binary data is executed. This is because binary data functionally divided to execute a specific test operation was received. A branch-off of an operation may occur according to a determination result. If all binary data is received and executed (Yes), a procedure is finished. If not (No), a procedure goes to the operation S212 and a receiving operation and an execution operation of the binary data with respect to the remaining functions are performed.

In FIG. 11, after receiving binary data in the operation S212, the binary data is executed by a separate command in the operation S222. However, example embodiments are not limited thereto. For example, an execution command CMD_EX may be included in the binary data. That is, the operation S222 may be omitted, and if it is determined that the received binary data is valid (operation S218), the execution command CMD_EX is immediately executed and thereby a variety of test operations with respect to data storage may be executed.

According to example embodiments of inventive concepts, various software or firmware for testing data storage may be functionally divided to be sent to the data storage and executed through not a JTAG but a side-band interface. As a result, even after a memory vendor delivers constituent elements (e.g., controller, nonvolatile memory, DRAM, or package thereof etc.) constituting the data storage, a test operation with respect to the data storage such as an on-board SSD may be effectively executed.

Figure 12:
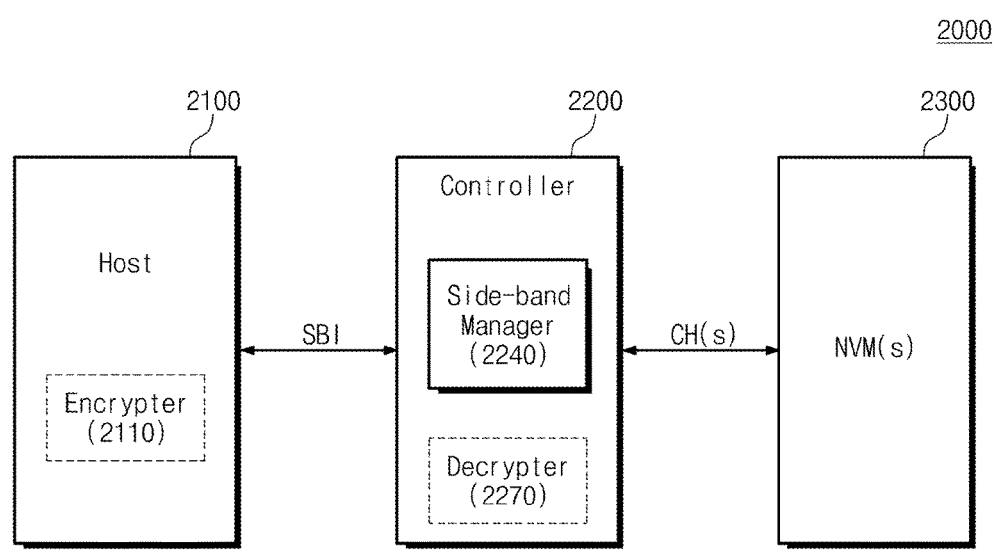
FIG. 12 is a block diagram illustrating a storage system in accordance with example embodiments of inventive concepts.

FIG. 12 is a block diagram illustrating a storage system in accordance with example embodiments of inventive concepts. A storage system 2000 may include a host 2100, and an on-board SSD including a controller 2200 and a nonvolatile memory device 2300.

The host 2100 (e.g., debugger) may encrypt binary data through an encrypter 2110 and send the encrypted binary data to the controller 2200. Binary data may be encrypted using an authentication key in combination with a XOR operation. Binary data may be decrypted using the authentication key and the XOR operation. However, example embodiments are not limited thereto.

The controller 2200 may include a side-band manager 2240 and a decrypter 2270. The side-band manager 2240 may communicate with the host 2100 through a side-band interface SBI. For example, the side-band interface may include at least one of I2C, UART and MTCP. However, example embodiments are not limited thereto and the side-band interface may be an interface except a JTAG. For example, the side-band manager 2240 may be constituted by software, hardware, or combinations thereof. The decrypter 2270 may decrypt the received binary data.

According to example embodiments of inventive concepts, security performance in a test operation may be improved by encrypting binary data to send it to the controller 2200.

Figure 13:
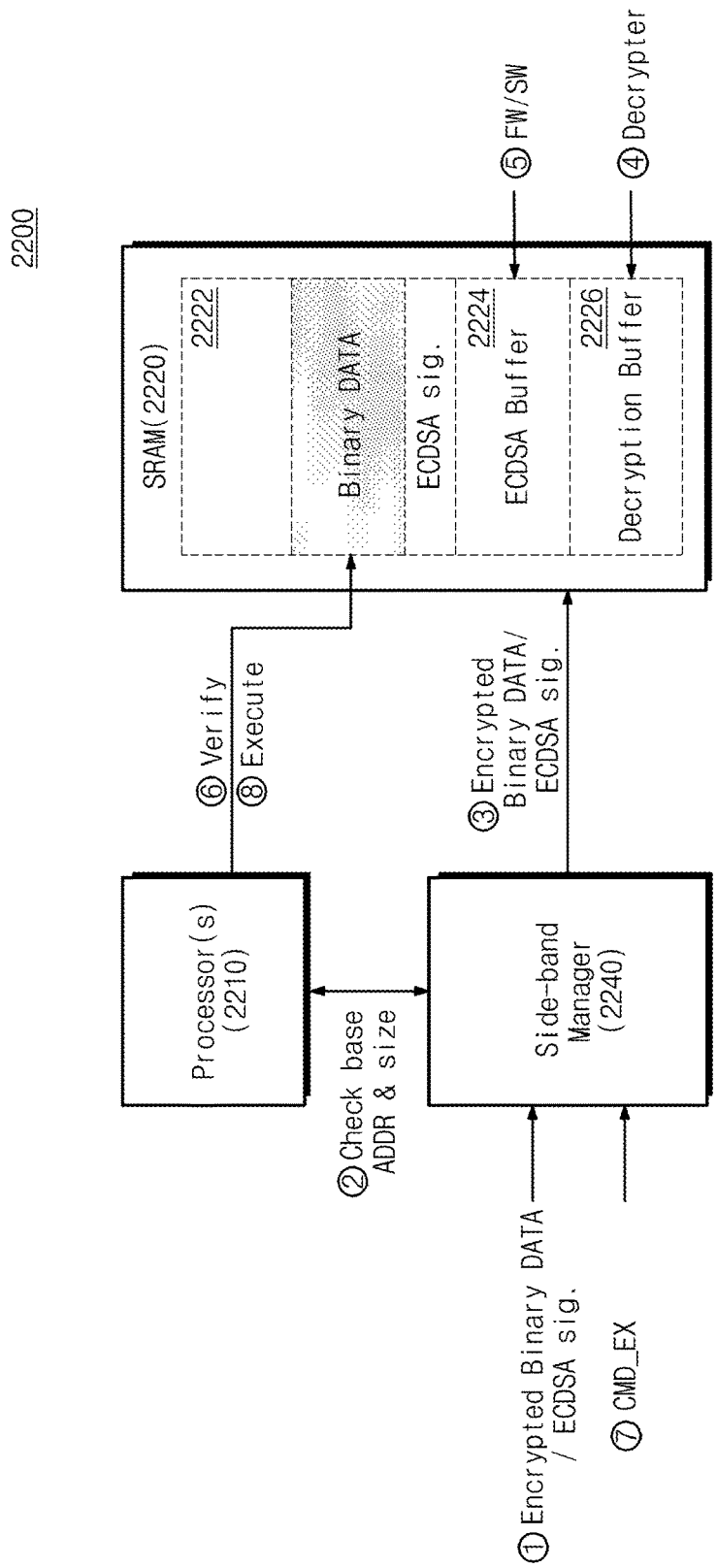
FIG. 13 is a block diagram illustrating a process of receiving and executing encrypted binary data through a side-band interface according to storage system illustrated in FIG. 12.

FIG. 13 is a block diagram illustrating a process of receiving and executing encrypted binary data through a side-band interface according to the storage system illustrated in FIG. 12.

The side-band manager 2240 may receive encrypted binary data from the host (e.g., debugger) ($\hat{1}$). The encrypted binary data may include firmware or software for a test operation. Address information needed when the encrypted binary data is stored in a SRAM 2220 and size information of the binary data may be received together with the encrypted binary data. An ECDSA signature for a validity check of the binary data may be received together with the encrypted binary data.

A processor 2210 may check the received address information and the size information to determine whether to store the encrypted binary data in the SRAM 2220 ($\hat{2}$). If a size of the encrypted binary data is smaller than an available space of the SRAM 2220 and the encrypted binary data is stored according to the address information not to create a collision with a system, the encrypted binary data and the ECDSA signature may be stored in the SRAM 2220 ($\hat{3}$).

The encrypted binary data may be decrypted ($\hat{4}$). A decrypter (or decrypting engine) may be loaded to perform a decryption. For example, the decrypter may be loaded into a third area 2226 of the SRAM 2220. The decrypter may be loaded from the ROM or the nonvolatile memory device 2300 (refer to FIG. 12).

It may be determined whether binary data is valid. To check validity, firmware or software for a validity check from the ROM or the nonvolatile memory device 2300 (refer to FIG. 12) may be loaded into the second area 2224 of the SRAM 2220 ($\hat{5}$).

In example embodiments, the processor 2210 may be a hardware processor such as central processing unit (CPU), a multi-processor, a distributed processing system, an application specific integrated circuit (ASIC), and/or a suitable hardware processing unit, that when executing instructions according to the firmware or software configures the processor 2210 as a special purpose processor for controlling one or more operations of the controller 2200. For example, the processor 2210 may drive the firmware or software for a validity check loaded into the second area 2224 and check validity of binary data using an ECDSA signature ($\hat{6}$). If the binary data is valid, the controller 2200 may receive an execution command CMD_EX from the host 2100 ($\hat{7}$). The binary data is executed according to the execution command CMD_EX and thereby a test operation with respect to the on-board SSD 2200 and 2300 may be executed ($\hat{8}$). If the binary data is invalid, a test operation is not executed.

Security performance in a test operation of a storage system may be improved by receiving the encrypted binary data from the host 2100 and executing a test operation.

Figure 14:
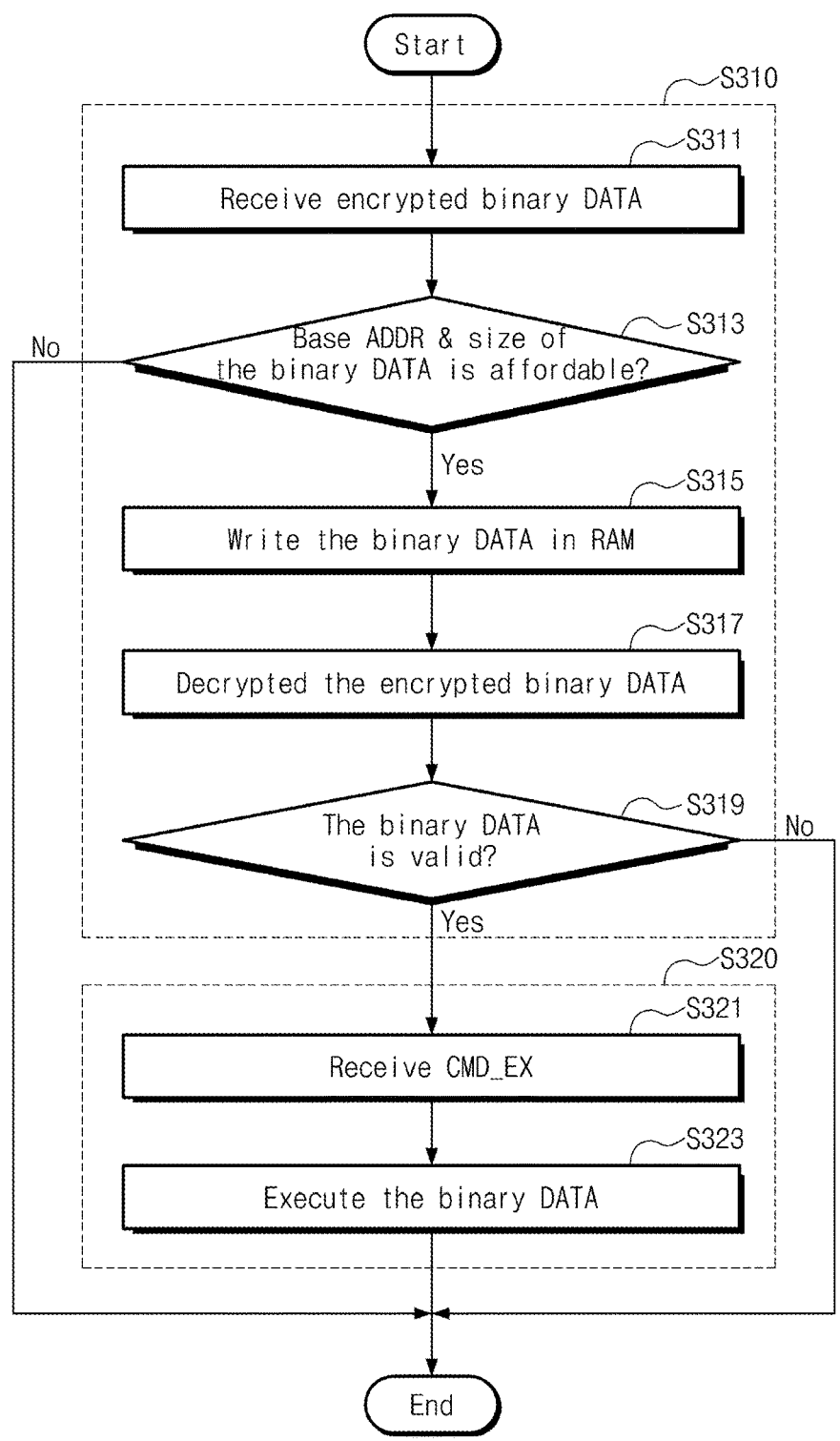
FIG. 14 is a flow chart illustrating a process of executing a test operation with respect to storage in accordance with example embodiments of inventive concepts.

FIG. 14 is a flow chart illustrating a process of executing a test operation with respect to storage in accordance with example embodiments of inventive concepts.

A test operation with respect to data storage may include receiving encrypted binary data through a side-band interface (S310) and executing the binary data (S320).

In operation S311, encrypted binary data may be received. The binary data may be encrypted by a host (e.g., debugger). The encrypted binary data may be received through not a JTAG but a side-band interface. The binary data may include software or firmware for a variety of test operations with respect to the data storage. At this time, address information on a memory in which the encrypted binary data is to be stored and size information of the binary data may be received together. An ECDSA signature for a validity check with respect to the binary data may be received together.

In operation S313, the received address information and the size information may be checked. The received address information and size information may be checked. If encrypted binary data is stored in a memory according to the received address information and thereby a collision with a system occurs, or a size of the binary data is greater than a capacity of an available memory (No), a normal test procedure cannot be performed. At this time, the side-band manager may send an error code to the host (e.g., debugger) and a procedure may be finished. If it is determined that the received address information and the received size information are appropriate (Yes), the procedure proceeds to operation S315.

In the operation S315, encrypted binary data may be stored in a SRAM or a DRAM. The encrypted binary data may be stored according to the address information received together with the binary data.

In operation S317, the encrypted binary data may be decrypted. The decryption may be executed by a decryptor or a decrypting engine loaded into the SRAM or the DRAM. For example, the decryptor or the decrypting engine may be loaded from a ROM in the controller or the nonvolatile memory device 2300 (refer to FIG. 12).

In operation S319, it may be determined whether the binary data is valid. Validity of the binary data may be determined using software or firmware for a validity check. The software or the firmware for a validity check of the binary data may be loaded from the ROM in the controller or the nonvolatile memory device 2300 (refer to FIG. 12). A branch-off of an operation may occur according to a determination result. If the binary data is determined to be valid (Yes), the procedure goes to operation S321. If the binary data is determined to be invalid (No), the procedure is finished.

In the operation S321, a command CMD_EX executing binary data may be received. The execution command CMD_EX may include various protocols for executing various tests with respect to the data storage.

In operation S323, the binary data may be executed. As a result of executing the binary data, various test operations with respect to the data storage may be executed.

In FIG. 14, after receiving binary data in the operation S311, the binary data is executed by a separate command in the operation S321. However, example embodiments are not limited thereto. For example, an execution command CMD_EX may be included in the binary data. That is, the operation S321 may be omitted, and if it is determined that the received binary data is valid (operation S319), the execution command CMD_EX is immediately executed and thereby a variety of test operations with respect to data storage may be executed.

According to example embodiments of inventive concepts, various software or firmware for testing the data storage may be sent to the data storage through not a JTAG but a side-band interface (e.g., I2C, UART, MTCP, etc.). At this time, security performance in a test operation may be improved by encrypting the software or the firmware to send it to the data storage. Even after a memory vendor delivers constituent elements (e.g., controller, nonvolatile memory, DRAM, or package thereof etc.) constituting the data storage, a test operation with respect to the data storage may be effectively executed.

Figure 15:
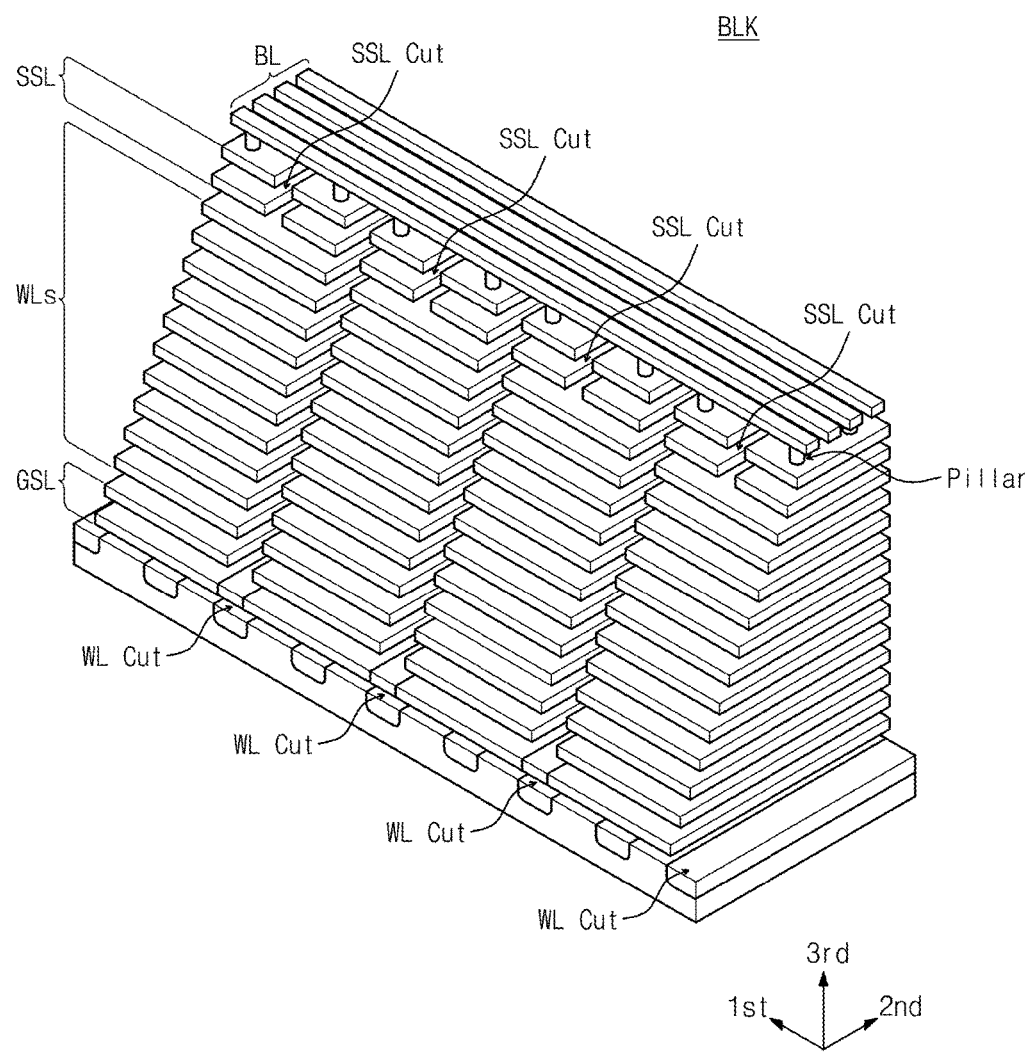
FIG. 15 is a drawing illustrating a memory block VNAND of data storage according to example embodiments of inventive concepts.

FIG. 15 is a drawing illustrating a memory block VNAND of data storage according to example embodiments of inventive concepts. Referring to FIG. 15, four sub blocks may be formed on a substrate. Each sub block may be formed by laminating at least one ground select line GSL, a plurality of word lines WLs, and at least one string select line SSL in a layer form between word line cuts on the substrate. At least one string select line SSL may be divided by a string select line cut. Although not illustrated in the drawing, each word line cut may include a common source line CSL. For example, the common source lines CSL included in the word line cuts may be connected in common. A pillar connected to a bit line penetrates at least one ground select line GSL, a plurality of word lines WLs, and at least one string select line SSL to form a string.

In FIG. 15, an object between word line cuts is illustrated as a sub block but example embodiments are not limited thereto. The sub block of may be an object between the word line cut and the string select line cut.

A block BLK in accordance with example embodiments of inventive concepts may be embodied by a structure in which two word lines are merged into one, that is, a merged word line structure.

Figure 16:
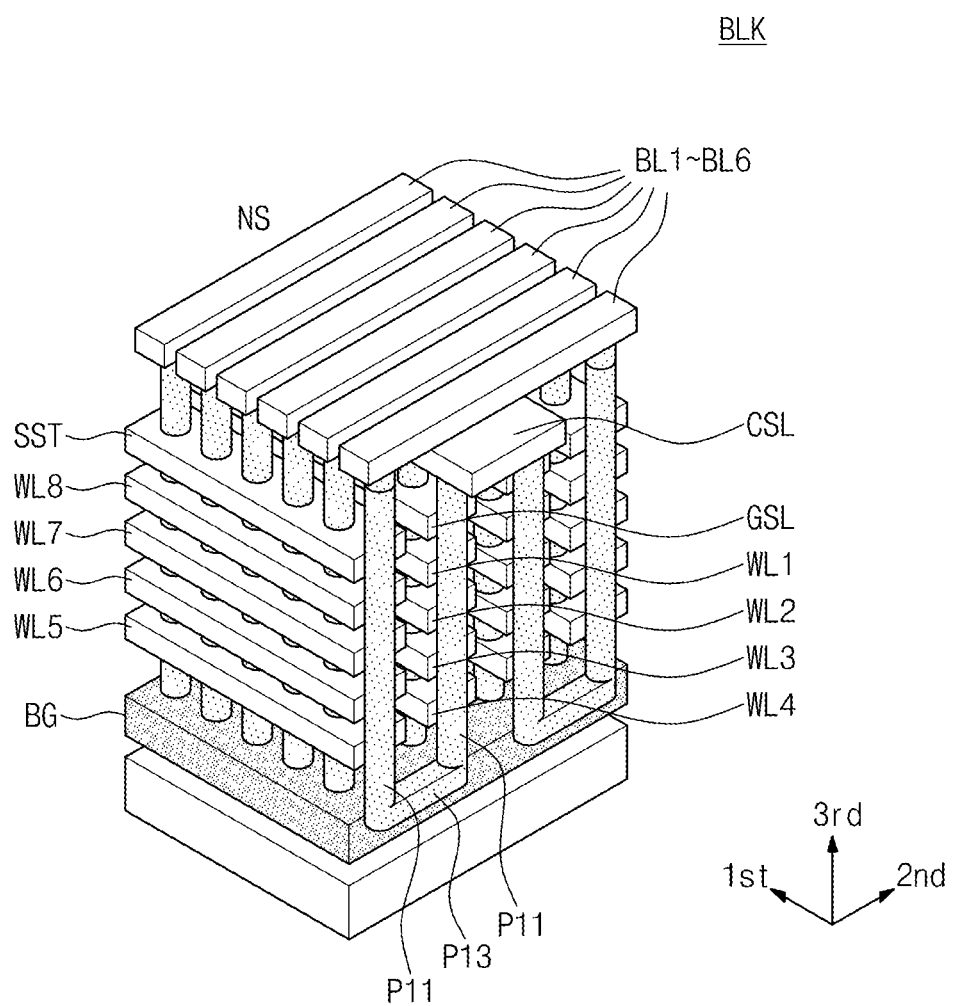
FIG. 16 is a drawing illustrating a memory block VNAND of data storage according to example embodiments of inventive concepts.

FIG. 16 is a drawing illustrating a memory block VNAND of data storage in accordance with example embodiments of inventive concepts. For convenience of description, it is assumed that the number of layers of word line of the memory block BLK is 4. The memory block BLK may be embodied in a PBiCS (pipe-shaped bit cost scalable) structure in which bottoms of adjacent serially connected memory cells are connected by a pipe. The memory block BLK includes strings NS of m×n (m and n are natural numbers).

In FIG. 16, a case of m=6 and n=2 is illustrated. Each string NS may include memory cells MC1~MC8 serially connected. A first top of the memory cells MC1~MC8 is connected to a string select transistor SST, a second top of the memory cells MC1~MC8 is connected to a ground select transistor GST and bottoms of the memory cells MC1~MC8 may be connected by a pipe. FIG. 16 illustrates an example where each string NS includes 8 memory cells MC1~MC8, but example embodiments are not limited thereto and the number of memory cells in each string NS may be adjusted in other example embodiments.

Memory cells constituting a string NS may be laminated on a plurality of semiconductor layers to be formed. Each string NS may include a first pillar PL11, a second pillar PL12 and a pillar connection part PL13 connecting the first pillar PL11 and the second pillar PL12. The first pillar PL11 is connected to a bit line (e.g., BL1) and the pillar connection part PL13, and may be formed by penetrating a string select line SSL and word lines WL5~WL8. The second pillar PL12 is connected to a common source line CSL and the pillar connection part PL13, and may be formed by penetrating a ground select line GSL and word lines WL1~WL4. As illustrated in FIG. 16, the string NS may be embodied in a pillar form of a U character shape.

A back-gate BG is formed on a substrate and the pillar connection part PL13 may be embodied inside the back-gate BG. The back-gate BG may exist in the block BLK in common. The back-gate BG may have a structure separated from back-gates of other blocks.

Figure 17:
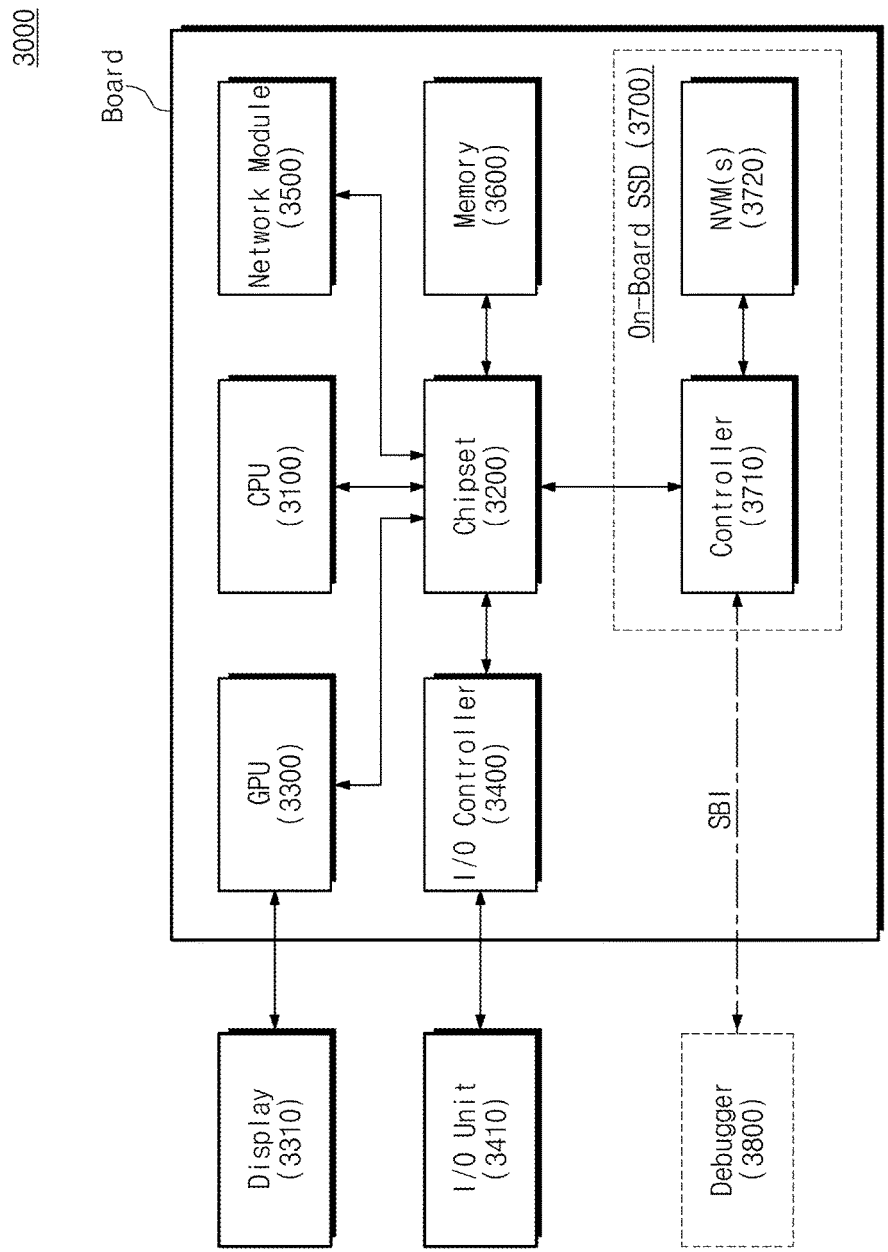
FIG. 17 is a block diagram illustrating a computing system including data storage in accordance with example embodiments of inventive concepts.

FIG. 17 is a block diagram illustrating a computing system including data storage in accordance with example embodiments of inventive concepts. A computing system 3000 may include at least one of various electronic devices having a side-band interface such as a desk top, a laptop, an UMPC (ultra mobile PC), a net-book, a tablet, a smart phone, etc.

Referring to FIG. 17, the computing system 3000 may include a CPU (central processing unit) 3100, a chip set 3200, a GPU (graphic processing unit) 3300, a display 3310, an I/O controller 3400, an I/O unit 3410, a network module 3500, a memory 3600, and an on-board SSD 3700. The on-board SSD may be a data storage in which a controller 3710 and a nonvolatile memory device 3720 constituting the data storage are directly mounted on a board.

The CPU (central processing unit) 3100, the chip set 3200, the GPU (graphic processing unit) 3300, the I/O controller 3400, the network module 3500, the memory 3600, the controller 3710 and the nonvolatile memory device 3720 may be provided on the board. For example, the board may include at least one of various types of substrates such as a PCB (printed circuit board), a flexible board, and a tape board. The board may be formed by a flexible printed circuit board inside which internal interconnections are formed, a rigid printed circuit board, or combinations thereof.

The CPU 3100 may drive an operating system OS for operating the computing system 3000 or an application program.

The chipset 3200 may control various constituent elements included in the computing system 3000 under the control of the CPU 3100. For example, the chipset 3200 may control an overall operation of the GPU 3300, the I/O controller 3400, the network module 3500, the memory 3600, and the on-board SSD 3700.

The GPU 3300 may process graphic data to send it to a display 3310. The display 3310 may display the graphic data processed by the GPU 3300. A panel of the display 3310 may be one of various panels such as a liquid crystal display panel (LCD), an electrophoretic display panel, an electrowetting display panel, a plasma display panel (PDP), an organic light-emitting diode (OLED), etc.

The I/O controller 3400 may process information inputted into the computing system 3000 by the I/O unit 3410. For example, the I/O unit 3410 may be connected to the I/O controller 3400 through a PS2 port, a PCI slot, a DIMM slot, a USB port, a RGB port, a DVI port, a HDMI port, etc.

The network module 3500 may provide an interface between the computing system 3000 and an external system or between the computing system 3000 and a network. For example, the network module 3500 may operate by a protocol such as Wi-Fi, Bluetooth, wireless-MAN (metropolitan area network), LTE-A (long term evolution advanced), EDGE (enhanced data rates for GSM (Global System for Mobile Communications) Evolution), HSPA+ (Evolved High-Speed Packet Access), Ethernet, Fibre Channel, and Power Line communication.

The memory 3600 may be used as a working memory of the computing system 3000. In a booting operation, an operating system OS and an application program read from the on-board SSD 3700 may be loaded into the memory 3600. For example, the memory 3600 may be constituted by a memory module. In this case, the memory module may include a volatile random access memory such as DRAM, SDRAM, DDR SDRAM, DDR2 SDRAM, DDR3 SDRAM, LPDDR SDRAM, LPDDR2 SDRAM, LPDDR3 SDRAM, etc. or a nonvolatile random access memory such as PRAM, ReRAM, MRAM, FRAM, etc.

The on-board SSD 3700 may include the controller 3710, the nonvolatile memory device 3720 and a DRAM (not illustrated). The on-board SSD 3700 may be connected to a debugger 3800 through a side-band channel SBI.

Software or firmware for testing the on-board SSD 3700 may be sent to the on-board SSD 3700 through a side-band channel SBI. Software or firmware for a test may be sent in a binary data form. To improve security performance, the binary data may be encrypted to be sent to the on-board SSD 3700. An ECDSA signature for a validity check of binary data may be sent together with the binary data. Firmware or software for a validity check of binary data may be stored in a ROM inside the controller 3710 or the nonvolatile memory device 3720.

Although not illustrated in the drawing, the computing system 3000 may further include a ROM in which a BIOS (basic input/output system) is stored, a camera image processor (CIS) and a battery.

According to example embodiments of inventive concepts, even after a memory vendor delivers a controller, a nonvolatile memory device, etc. constituting the on-board SSD, a test operation with respect to the on-board SSD may be effectively executed. In particular, even though a test with respect to the data storage cannot be executed under the JTAG environment, a test operation may be executed through a side-band channel.

According to example embodiments of inventive concepts, a method of executing a test operation with respect to an on-board SSD through a side-band channel may be provided.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A data storage comprising:
at least one nonvolatile memory device; and
a controller operatively connected to the at least one nonvolatile memory device,
wherein the controller is configured to receive binary data from a host through a side-band interface,
wherein the controller includes a buffer configured to store the binary data,
wherein the controller is configured to execute the binary data according to a request from the host to execute a test operation,
wherein the data storage is an on-board SSD in which the at least one nonvolatile memory device and the controller are mounted on a board,
wherein the binary data is divided according to a property of the test operation to provide divided binary data and is received from the host, and
wherein a size of the divided binary data is equal to or smaller than a size of the buffer.

2. The data storage of claim 1, wherein the side-band interface is an interface that is not a JTAG.

3. The data storage of claim 1, wherein
the controller is configured to receive address information for storing the binary data and size information corresponding to the binary data.

4. The data storage of claim 3, wherein the controller configured to store the binary data in the buffer according to the address information and the size information.

5. The data storage of claim 1, wherein
the controller is configured to receive an ECDSA (elliptic curve digital signature algorithm) signature from the host, and
the controller is configured to check validity of the binary data using the ECDSA signature.

6. The data storage of claim 1, wherein
the controller configured to receive encrypted binary data from the host, and
the controller is configured to decrypt the encrypted binary data.

7. The data storage of claim 1, wherein the board includes one of a printed circuit board, a flexible board, a tape board, and a combination thereof.

8. A method of operating a data storage that includes a controller and is configured to transmit and receive data to and from a host, the method comprising:
receiving binary data from the host through a side-band interface, wherein the side-band interface is included in the controller, and
the binary data is related to executing a test operation with respect to the data storage; and
executing, by the controller, the binary data according to a request from the host,
wherein the data storage is an on-board SSD in which at least one nonvolatile memory device and the controller are mounted on a board,
wherein the receiving the binary data includes dividing the binary data according to a property of the test operation for the data storage.

9. The method of claim 8, wherein
the receiving binary data includes receiving an ECDSA (elliptic curve digital signature algorithm) signature, and
the controller is configured to use the ECDSA signature for a validity check of the binary data.

10. The method of claim 9, further comprising:
storing the binary data in a buffer according to address information and size information of the binary data; and
checking validity of the binary data using the ECDSA signature, wherein
the storing the binary data and the checking validity of the binary data is performed after receiving the binary data.

11. The method of claim 8, further comprising:
determining whether all of the divided binary data has been executed.

12. A data storage comprising:
at least one nonvolatile memory device; and
a controller operatively connected to the at least one nonvolatile memory device,
the controller being configured to receive binary data from a host through a side-band interface,
wherein the controller is configured to perform a validity test on the binary data,
wherein the controller is configured to execute the binary data for performing at least one test operation if the validity test indicates that the binary data is valid,
wherein the data storage is an on-board SSD in which at least one nonvolatile memory device and the controller are mounted on a board,
wherein the binary data includes address information and size information,
wherein the controller is configured to determine if a size of the binary data is less than or equal to an available space of a first memory,
wherein the controller is configured to send an error code to the host if the size of the binary data is greater than the available space of the first memory,
wherein the controller is configured to store the binary data in the available space of the first memory if the size of the binary data is less than or equal to the available space of the first memory, and
wherein the controller is configured to execute the binary data for performing the at least one test operation if the size of the binary data is less than or equal to the available space of the first memory.

13. The data storage of claim 12, wherein the side-band interface is not a JTAG.

14. The data storage of claim 12, wherein
the binary data includes an ECDSA (elliptic curve digital signature algorithm), and
the controller is configured to perform the validity test on the binary data using the ECDSA signature.

* * * * *